(12) United States Patent  
Potter (10) Patent No.: US 10,362,904 B2
(45) Date of Patent: Jul. 30, 2019

(54) FOOD PROCESSOR SYSTEM

(71) Applicant: SharkNinja Operating LLC, Newton, MA (US)

(72) Inventor: Daniel Stephen Potter, Seabrook, NH (US)

(73) Assignee: SHARKNINJA OPERATING LLC, Newton, MA (US)

( * ) Notice: Subject to any disclaimer, the term of this patent is extended or adjusted under 35 U.S.C. 154(b) by 0 days.

(21) Appl. No.: 15/453,117

(22) Filed: Mar. 8, 2017

(65) Prior Publication Data

US 2017/0172347 A1 Jun. 22, 2017

Related U.S. Application Data

(62) Division of application No. 14/927,998, filed on Oct. 30, 2015, now Pat. No. 9,717,370.

(Continued)

(51) Int. Cl.
*A47J 43/07* (2006.01)
*A47G 29/093* (2006.01)
(Continued)

(52) U.S. Cl.
CPC ............ *A47J 43/0716* (2013.01); *A47G 1/17* (2013.01); *A47G 29/093* (2013.01); *A47J 45/02* (2013.01);
(Continued)

(58) Field of Classification Search
CPC ...... A47G 1/17; A47G 19/10; A47G 23/0225; A47G 29/093; F16B 47/00; F16B 47/006; A47J 43/00; A47J 2043/04454; A47J 2043/04463; A47J 45/00; A47J 45/02; A47J 47/00; A47J 47/16; A47J 43/0716;
(Continued)

(56) References Cited

U.S. PATENT DOCUMENTS 1,883,791 A   10/1932  Jewell
2,212,755 A * 8/1940  Solomon ............... B66C 1/0212
                                                     294/187

(Continued)

FOREIGN PATENT DOCUMENTS

DE           29911526 U1    1/2000

OTHER PUBLICATIONS

International Search Report; International Application No. PCT/US2015/058246; International Filing Date: Oct. 30, 2015; dated Feb. 4, 2016; 7 Pages.

(Continued)

*Primary Examiner* — Jonathan Liu
*Assistant Examiner* — Taylor L Morris
(74) *Attorney, Agent, or Firm* — Cantor Colburn LLP (57) ABSTRACT

A base for a food processing system is provided including a housing configured to couple with a complementary container. The housing includes a bottom surface. At least one suction device is mounted to the bottom surface and is configured to adhere the base to an adjacent surface. At least one release mechanism is mounted to mounted generally flush with an outer surface of the housing. The at least one release mechanism is operably coupled to at least one suction device and is movable between a first position and a second position to release the at least one suction device from the adjacent surface.

10 Claims, 7 Drawing Sheets

Related U.S. Application Data (60) Provisional application No. 62/129,493, filed on Mar. 6, 2015.

(51) Int. Cl.
| | |
|---|---|
| *A47G 1/17* | (2006.01) |
| *A47J 47/00* | (2006.01) |
| *F16B 47/00* | (2006.01) |
| *A47J 45/02* | (2006.01) |
| *A47J 36/34* | (2006.01) |
| *F16M 13/00* | (2006.01) |
| *F16M 13/02* | (2006.01) |
| *A47G 19/10* | (2006.01) |
| *A47J 45/00* | (2006.01) |
| *A47J 47/16* | (2006.01) |
| *A47J 43/044* | (2006.01) |
| *A47J 43/00* | (2006.01) |

(52) U.S. Cl.
CPC .............. *A47J 47/00* (2013.01); *F16B 47/00* (2013.01); *F16B 47/006* (2013.01); *A47G 19/10* (2013.01); *A47J 36/34* (2013.01); *A47J 43/00* (2013.01); *A47J 45/00* (2013.01); *A47J 47/16* (2013.01); *A47J 2043/04454* (2013.01); *A47J 2043/04463* (2013.01); *F16M 13/00* (2013.01); *F16M 13/022* (2013.01)

(58) Field of Classification Search
CPC ........ A47J 43/0727; A47J 43/07; A47J 36/34; F16M 2200/08; F16M 13/022
USPC ..... 248/206.2, 206.3, 309.3, 346.01, 346.11, 248/205.5, 205.8, 362, 363, 683; 220/483, 630, 636, 737
See application file for complete search history.

(56) References Cited

U.S. PATENT DOCUMENTS

| | | | | |
|---|---|---|---|---|
| 2,287,576 | A * | 6/1942 | Solomon | B21D 43/18 294/187 |
| 2,634,077 | A * | 4/1953 | Dusen | F16B 47/00 248/205.8 |
| 3,061,351 | A * | 10/1962 | Johnson | E04G 23/006 294/187 |
| 3,082,988 | A * | 3/1963 | Holden | A47J 45/02 248/205.8 |
| 3,638,889 | A | 2/1972 | Samuelson | |
| 4,091,945 | A | 5/1978 | Patterson | |
| 4,760,987 | A | 8/1988 | Lan | |
| 4,846,429 | A | 7/1989 | Scheurer et al. | |
| 4,932,701 | A | 6/1990 | Cornillier et al. | |
| 5,020,754 | A | 6/1991 | Davis et al. | |
| 5,080,309 | A | 1/1992 | Ivins | |
| 5,176,357 | A | 1/1993 | Hobart | |
| 5,381,990 | A * | 1/1995 | Belokin | F16B 47/00 248/205.9 |
| 5,405,112 | A * | 4/1995 | Trethewey | F16B 47/00 248/205.8 |
| 5,454,540 | A | 10/1995 | McPherson et al. | |
| 5,474,206 | A | 12/1995 | Herring, Sr. | |
| 5,651,520 | A * | 7/1997 | Belokin | F16B 2/185 248/205.5 |
| 5,970,860 | A | 10/1999 | Yip | |
| 6,375,143 | B1 * | 4/2002 | Burns | F16B 47/00 160/370.21 |
| 6,425,565 | B1 * | 7/2002 | Montague | F16B 47/00 248/205.9 |
| 6,439,760 | B1 | 8/2002 | Langeloh et al. | |
| 6,581,541 | B2 * | 6/2003 | Hollinger | A01K 5/0114 119/61.5 |
| 6,648,285 | B1 * | 11/2003 | Woollen | F16B 47/00 248/205.8 |
| 6,932,306 | B2 * | 8/2005 | Zou | F16B 45/00 248/205.5 |
| 6,942,190 | B1 * | 9/2005 | Lu | F16B 47/00 248/205.5 |
| 7,207,510 | B2 * | 4/2007 | Wong | B02C 18/305 241/82.1 |
| 7,469,868 | B2 | 12/2008 | Bury | |
| 7,665,706 | B2 | 2/2010 | Chien et al. | |
| 7,748,671 | B2 | 7/2010 | Takahashi | |
| 7,861,647 | B2 * | 1/2011 | So | A47J 43/0727 220/483 |
| 8,199,496 | B2 * | 6/2012 | Liu | E05C 19/00 312/223.1 |
| 8,231,089 | B2 | 7/2012 | Mills | |
| 8,262,005 | B2 | 9/2012 | Garcia | |
| 8,721,164 | B2 | 5/2014 | Audette | |
| 8,757,426 | B1 * | 6/2014 | Serrano | A47G 19/2261 220/630 |
| 2003/0132236 | A1 * | 7/2003 | Safont | A47J 43/0727 220/890 |
| 2006/0243837 | A1 | 11/2006 | Wong | |
| 2008/0061199 | A1 | 3/2008 | Chen | |
| 2008/0111037 | A1 * | 5/2008 | Carnevali | F16B 47/00 248/206.2 |
| 2010/0164241 | A1 | 7/2010 | Finck | |
| 2012/0024993 | A1 * | 2/2012 | Audette | A47J 43/0777 241/30 |
| 2012/0112023 | A1 | 5/2012 | Tollman | |
| 2012/0287560 | A1 * | 11/2012 | Fan | F16B 47/00 361/679.01 |
| 2014/0252146 | A1 * | 9/2014 | Audette | A47J 43/046 241/47 |
| 2014/0346262 | A1 | 11/2014 | Audette et al. | |
| 2015/0008226 | A1 | 1/2015 | Dotson | |
| 2016/0256002 | A1 | 9/2016 | Potter | |
| 2016/0345781 | A1 * | 12/2016 | Cheung | F16B 47/00 |

OTHER PUBLICATIONS

Non-Final Office Action; U.S. Appl. No. 14/927,998, filed Oct. 30, 2015; Food Processor System; dated Jul. 22, 2016; 15 Pages.
Notice of Allowance; U.S. Appl. No. 14/927,998, filed Oct. 30, 2015; Food Processor System; dated Dec. 9, 2016; 14 Pages.
Requirement for Restriction/Election; U.S. Appl. No. 14/927,998, filed Oct. 30, 2015; Food Processor System; dated May 3, 2016; 9 Pages.
Written Opinion of the International Searching Authority; International Application No. PCT/US2015/058246; International Filing Date: Oct. 30, 2015; dated Feb. 4, 2016; 4 Pages.
PCT International Preliminary Report on Patentability; International Application No. PCT/US2015/058246; International Filing Date: Oct. 30, 2015; dated Sep. 12, 2017; pp. 1-6.
EP Communicatioun Pursuant to Article 94(3) EPC, Application No. 15 791 201.5-1006; dated Jun. 21, 2018; pp. 1-5.
Communication pursuant to Article 94(3) EPC, European Patent Office, Application No. 15791201.5-1006, dated Dec. 10, 2018 (5 pp).

\* cited by examiner

FOOD PROCESSOR SYSTEM

CROSS-REFERENCE TO RELATED APPLICATIONS

This application is a divisional of U.S. patent application Ser. No. 14/927,998, filed on Oct. 30, 2015, which is related to and claims the benefit of U.S. Provisional Patent Application Ser. No. 62/129,493, filed on Mar. 6, 2015, the entire contents of which are incorporated herein by reference.

BACKGROUND

This application is directed to a food processor, and more particularly, to a food processor having one or more unique features designed for enhancing the safety, ease of use, and/or versatility of the food processor.

Blenders are commonly used to process a plurality of different food products, including liquids, solids, semi-solids, gels and the like. It is well-known that blenders are useful devices for blending, cutting, and dicing food products in a wide variety of commercial settings, including home kitchen use, professional restaurant or food services use, and large-scale industrial use. They offer a convenient alternative to chopping or dicing by hand, and often come with a range of operational settings and modes adapted to provide specific types or amounts of food processing, e.g., as catered to particular food products.

SUMMARY

According to one embodiment of the invention, a base for a food processing system is provided including a housing configured to couple with a complementary container. The housing includes a bottom surface. At least one suction device is mounted to the bottom surface and is configured to adhere the base to an adjacent surface. At least one release mechanism is mounted to mounted generally flush with an outer surface of the housing. The at least one release mechanism is operably coupled to at least one suction device and is movable between a first position and a second position to release the at least one suction device from the adjacent surface.

In addition to one or more of the features described above, or as an alternative, in further embodiments the release mechanism is configured to move vertically between the first position and the second position.

In addition to one or more of the features described above, or as an alternative, in further embodiments the release mechanism is configured to move between the first position and the second position in response to application of a force by a user of the food processing system.

In addition to one or more of the features described above, or as an alternative, in further embodiments the release mechanism includes a planar surface arranged approximately parallel to the bottom surface.

In addition to one or more of the features described above, or as an alternative, in further embodiments the at least one release mechanism includes a first release mechanism and a second release mechanism disposed at opposing side of the base.

In addition to one or more of the features described above, or as an alternative, in further embodiments the first release mechanism and the second release mechanism are independently operable.

In addition to one or more of the features described above, or as an alternative, in further embodiments the at least one suction device includes a front right suction device, a back right suction device, a front left suction device, a back left suction device.

In addition to one or more of the features described above, or as an alternative, in further embodiments the first release mechanism is operably coupled to the front right suction device and the back right suction device. Similarly, the second release mechanism is operably coupled to the front left suction device and the back left suction device.

In addition to one or more of the features described above, or as an alternative, in further embodiments the at least one suction device is a suction cup.

In addition to one or more of the features described above, or as an alternative, in further embodiments the container configured to couple to the base further includes a rotatable assembly driven about an axis. The rotatable blade assembly is positioned adjacent a bottom of the container.

In addition to one or more of the features described above, or as an alternative, in further embodiments the container configured to couple to the base further includes a rotatable assembly driven about an axis. The rotatable blade assembly is positioned adjacent a top of the container.

According to another embodiment of the invention, a method of releasing a base of a food processing system from an adjacent surface is provided including actuating a first release mechanism to initiate release of at least one suction device operably coupled thereto. The first release mechanism is arranged generally flush with a first side of a housing of the base. A second release mechanism is actuated to initiate release of at least one suction device operably coupled thereto. The second release mechanism is arranged generally flush with a second side of the housing of the base. The base is separated from the adjacent surface.

In addition to one or more of the features described above, or as an alternative, in further embodiments the first release mechanism and the second release mechanism are actuated simultaneously.

In addition to one or more of the features described above, or as an alternative, in further embodiments the first release mechanism and the second release mechanism are actuated independently.

In addition to one or more of the features described above, or as an alternative, in further embodiments at least one of the first release mechanism and the second release mechanism is actuated by moving the release mechanism vertically between a first position and a second position.

In addition to one or more of the features described above, or as an alternative, in further embodiments the at least one suction device includes a front right suction device, a back right suction device, a front left suction device, a back left suction device.

In addition to one or more of the features described above, or as an alternative, in further embodiments actuation of the first release mechanism is configured to initiate release of the front right suction device and the back right suction device. Similarly, actuation of the second release mechanism is configured to initiate release of the front left suction device and the back left suction device.

BRIEF DESCRIPTION OF THE FIGURES

The accompanying drawings incorporated in and forming a part of the specification embodies several aspects of the present invention and, together with the description, serves to explain the principles of the invention. In the drawings.

The detailed description explains embodiments of the invention, together with advantages and features, by way of example with reference to the drawings.

DETAILED DESCRIPTION

Figure 1:
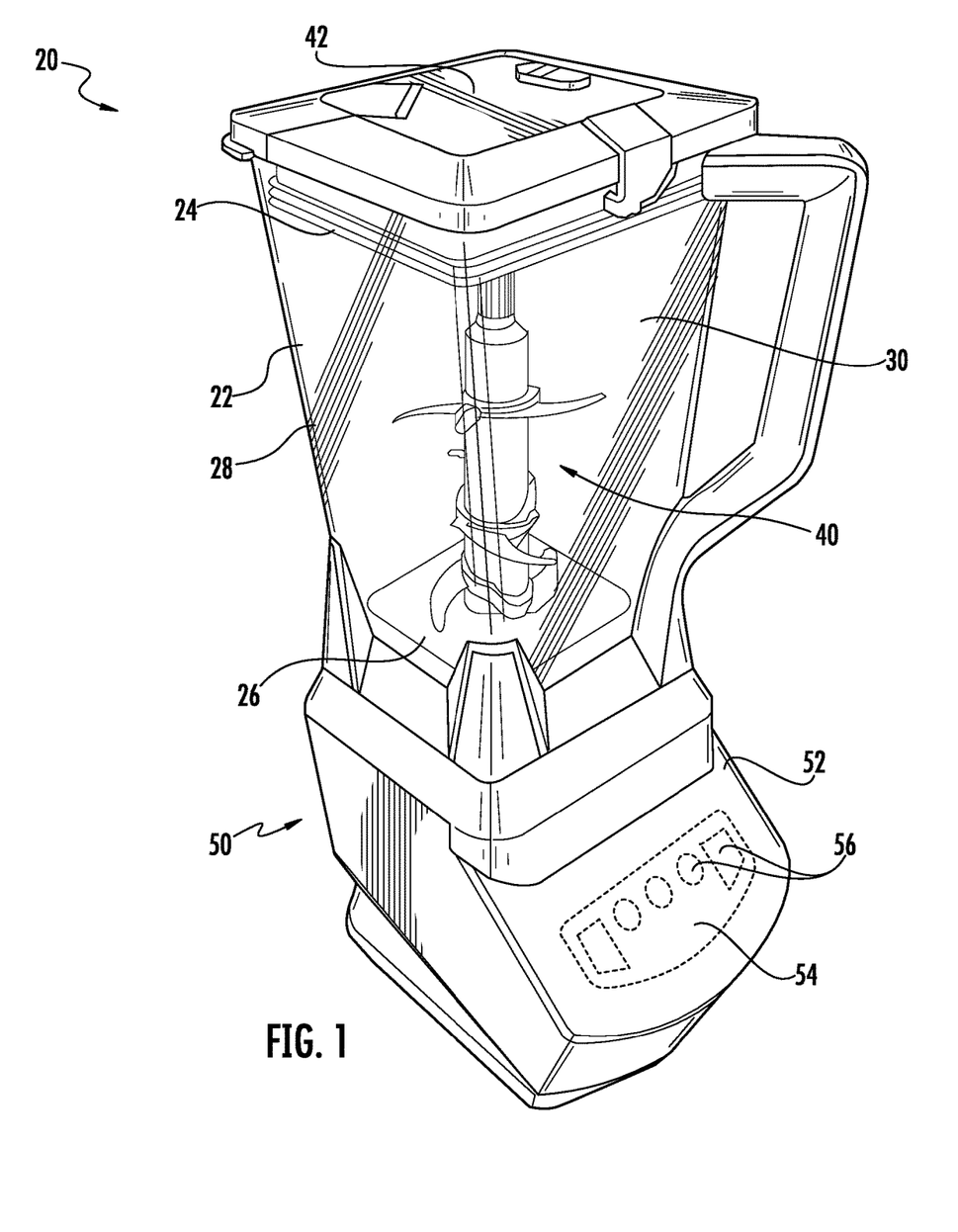
FIG. 1 is a perspective view of an example of a food processing system.
Figure 2:
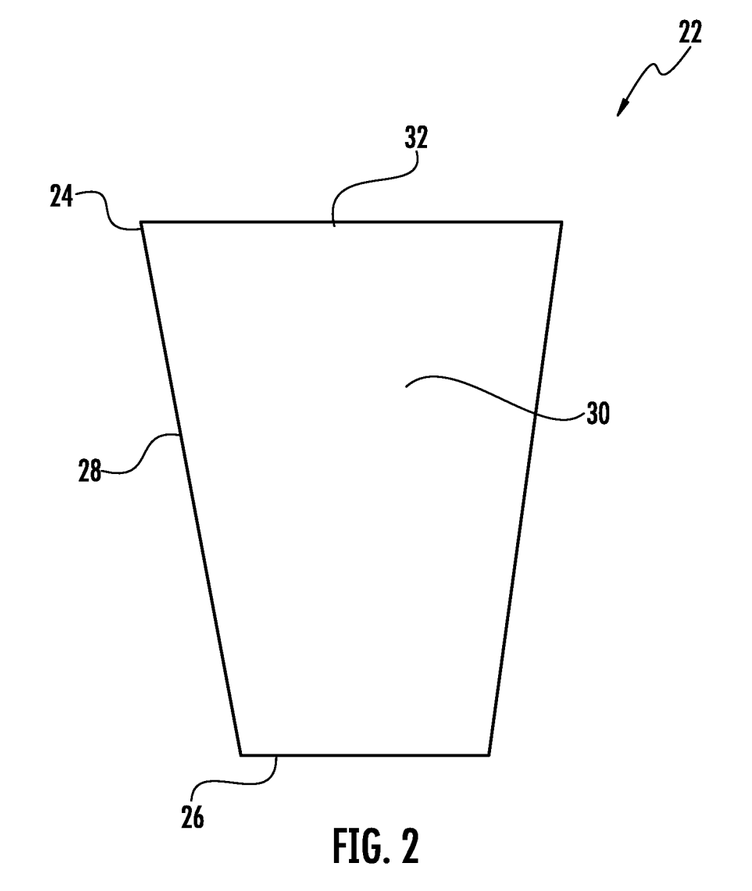
FIG. 2 is a cross-sectional view of a container configured for use with a food processing system.

FIG. 1 illustrates view of an example of a food processing system 20 according to an embodiment of the present invention. The food processing system 20 includes a container 22 adapted (e.g. sized and dimensioned) to receive one or more food products therein to be processed. In general, the food processing system 20 can be adapted to perform any food processing or blending including as non-limiting examples, dicing, chopping, cutting, slicing, mixing, blending, stirring, crushing, or the like. The container 22 generally includes a top 24, a bottom 26, and one or more walls 28 extending there between to define an interior chamber 30 within which food products are placed and processed. As best shown in the embodiment illustrated in FIG. 2, the top 24 of the container 22 includes an opening 32 that provides access for the one or more food items into the chamber 30. The bottom 26 is generally closed such that food products contained within the chamber are unable to escape the chamber 30 there through.

A rotatable blade assembly 40 is operably coupled to the chamber 30 to facilitate processing and/or the blending of food products. In one embodiment, as shown in FIG. 1, the container 22 is a conventional container wherein the rotatable blade assembly 40 is integrally formed with or configured to mount to the bottom 26 of the container 22. In such embodiments, a lid 42 is configured to attach to the top 24 of the container 22 prior to operation of the food processing system. The lid 42 may simply press-fit into the opening 32, or alternatively, may lock to the container 22. In another embodiment, the food processing system 20 is a personal blender system such that the rotatable blade assembly 40 is configured to selectively couple to the top 24 of the container 22.

In addition to the container 22, the food processing system 20 also includes a base 50 configured (e.g. sized, shaped, and arranged) to receive and couple with the container 22. The base 50 includes a housing 52 within which a motorized unit (not shown) and at least one controller (not shown) are located. The base 50 is adapted to couple with the container 22 such that when the container 22 is installed thereon, the motorized unit and the rotatable blade assembly 40 are mechanically coupled. As a result, the motorized unit can be adapted to drive rotation of the rotatable blade assembly 40 about an axis to perform one or more food processing and/or blending operations when one or more buttons 56 of a user interface 54 are actuated.

Depending on the type of container 22 being used, aspects of the present invention are directed to a food processor system 20 including a container 22 that is slidably or rotatably attached to the base 50. More specifically, the container 22 is configured to slidably or rotatably connect to the base 50 in a direction other than the direction of downward movement of the container 22 onto the base 50. In one embodiment, the sliding and/or rotational movement of the container 22 relative to the base 50 is in a direction that is substantially perpendicular to the downward movement of the container 22 onto the base 50. The container 22 may additionally be locked to the base 50.

Figure 3:
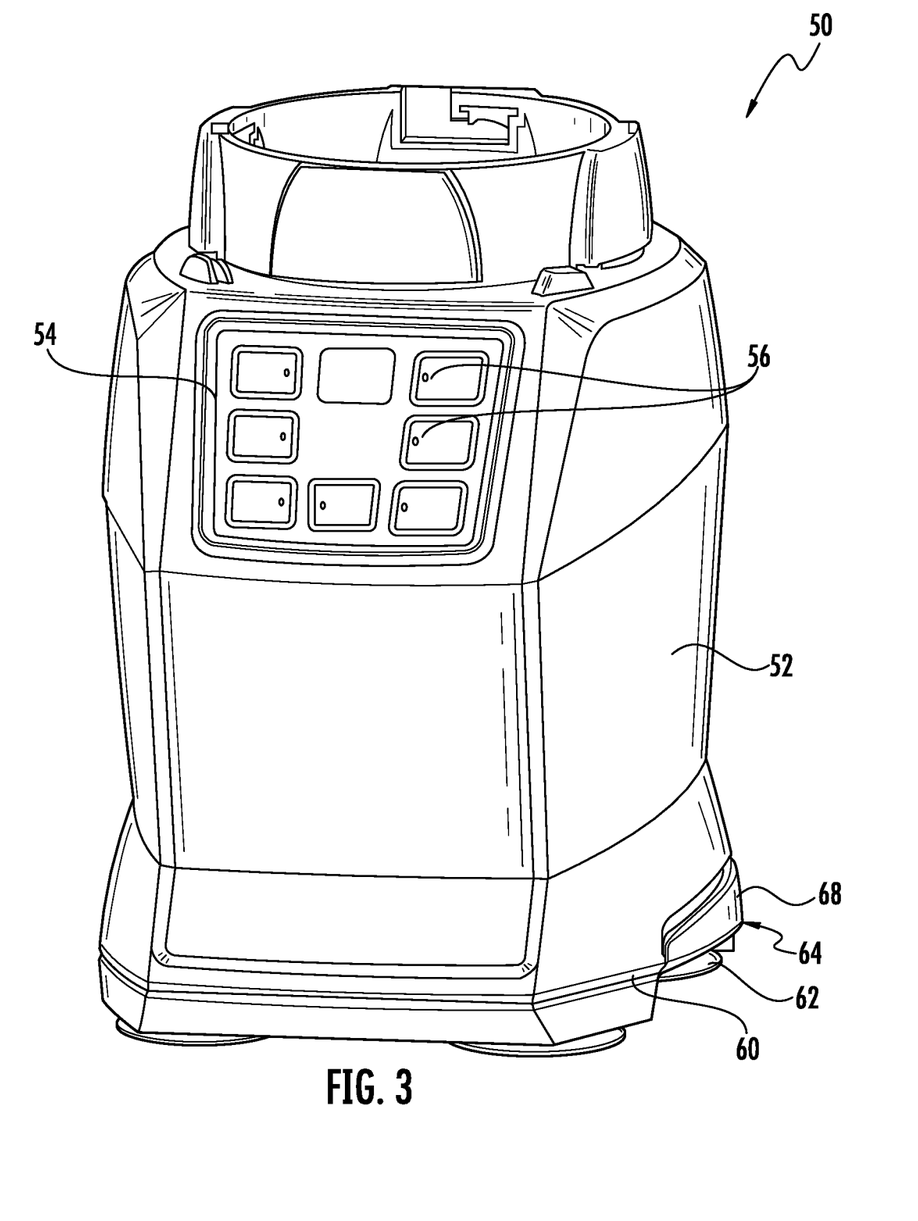
FIG. 3 is a perspective view of a base of a food processing system according to an embodiment of the invention.
Figure 4:
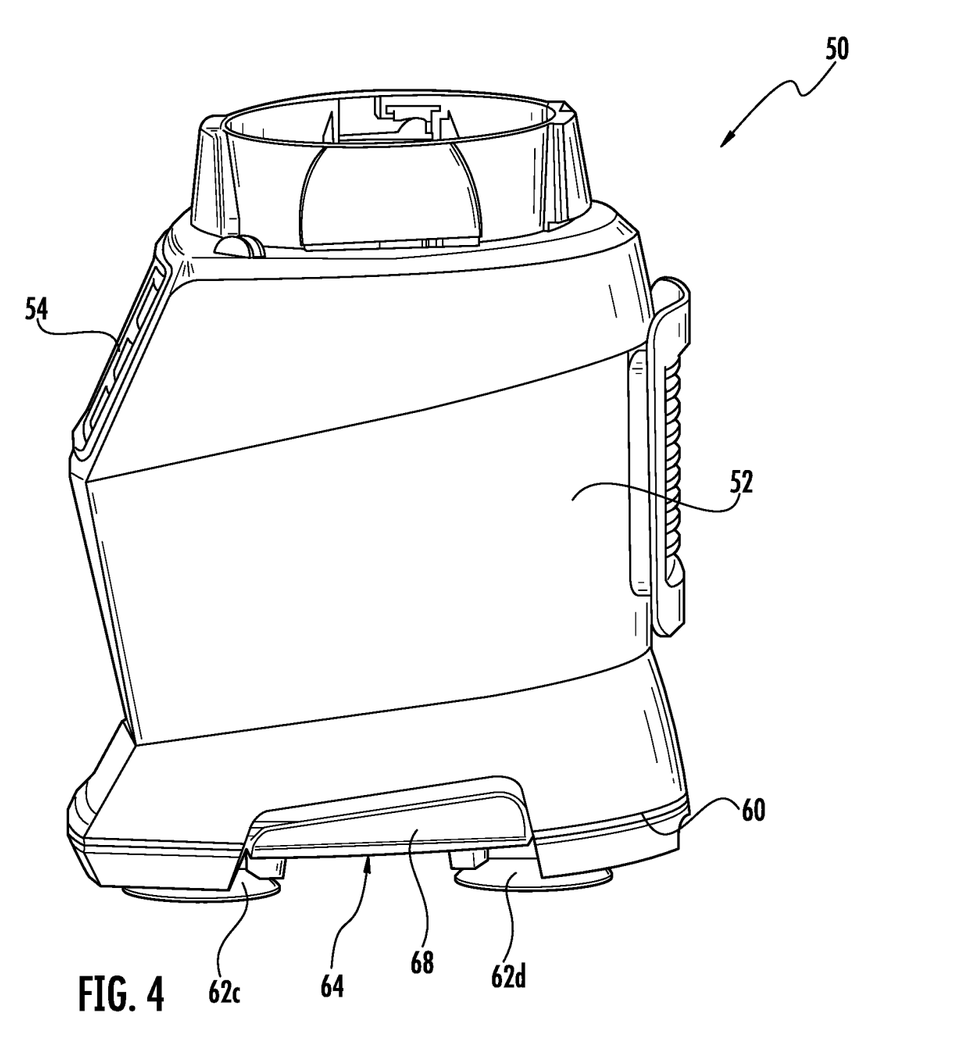
FIG. 4 is a side view of a base of a food processing system according to an embodiment of the invention.
Figure 5:
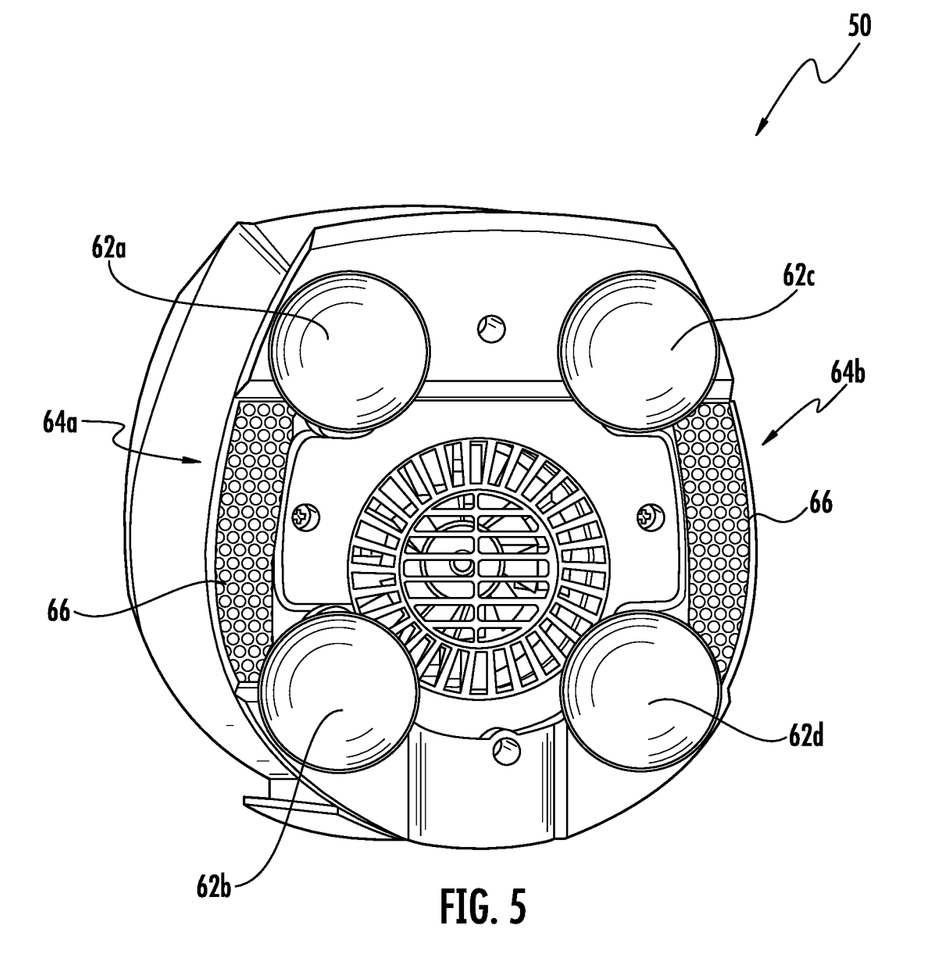
FIG. 5 is a bottom view of a base of a food processing system according to an embodiment of the invention.

Referring now to FIGS. 3-5, the base 50 is illustrated in more detail. The base 50 includes a bottom surface 60 having one or more suction devices 62, such as suctions cups for example, mounted to and extending downwardly therefrom. In the illustrated, non-limiting embodiment, the bottom surface 60 includes front and back left suction devices 62a, 62b and right suction devices 62c, 62d, respectively. The suction devices 62 are configured to adhere to a working surface, such as a counter top, particularly during operation of the food processing system 20. Utilizing four substantially identical suction devices provides increased stability to the base 50.

The bottom surface 60 additionally includes at least one release mechanism 64, such as a paddle or latch for example. The at least one release mechanism 64 generally includes a first surface 66, arranged substantially parallel to bottom surface 60 and may also include a flange 68 extending generally parallel to the first surface 66 at an edge thereof. The flange 68 is arranged generally flush with a portion of the base 50, for example an outer surface of the housing 52. As a result, the release mechanism 64 blends into and does not extend beyond the base 50, thereby improving the overall aesthetic appearance thereof. A grip or other feature configured to enhance operation by a user may be formed in surface 66. Each release mechanism 64 is operably coupled to one or more of the suction devices 62. In one embodiment, the bottom 60 includes a first release mechanism 64a and a second release mechanism 62b disposed on opposing sides of base 50 (see FIG. 5). The at least one release mechanism 64 is positioned vertically above the plurality of suction devices 62 and includes a surface 66 arranged generally parallel to the bottom surface 60. The first release mechanism 64a may be coupled to the front and back left suction devices 62a, 62b and the second release mechanism 64b may be coupled to the front and back right suction devices 62c, 62d, respectively.

Each release mechanism 64 is movable between a first normal position and a second, actuated position. The release mechanism 64 is configured to move between the first and second position in response to application of a force, for example a vertical force, applied by a user. Once the force is removed, the release mechanism 64 is configured to return to the first position via gravity or a biasing mechanism (not shown). In embodiments having two or more release mechanisms 64, the plurality of release mechanisms 64 may be operated independently, or alternatively, may be operated simultaneously.

Figure 6:
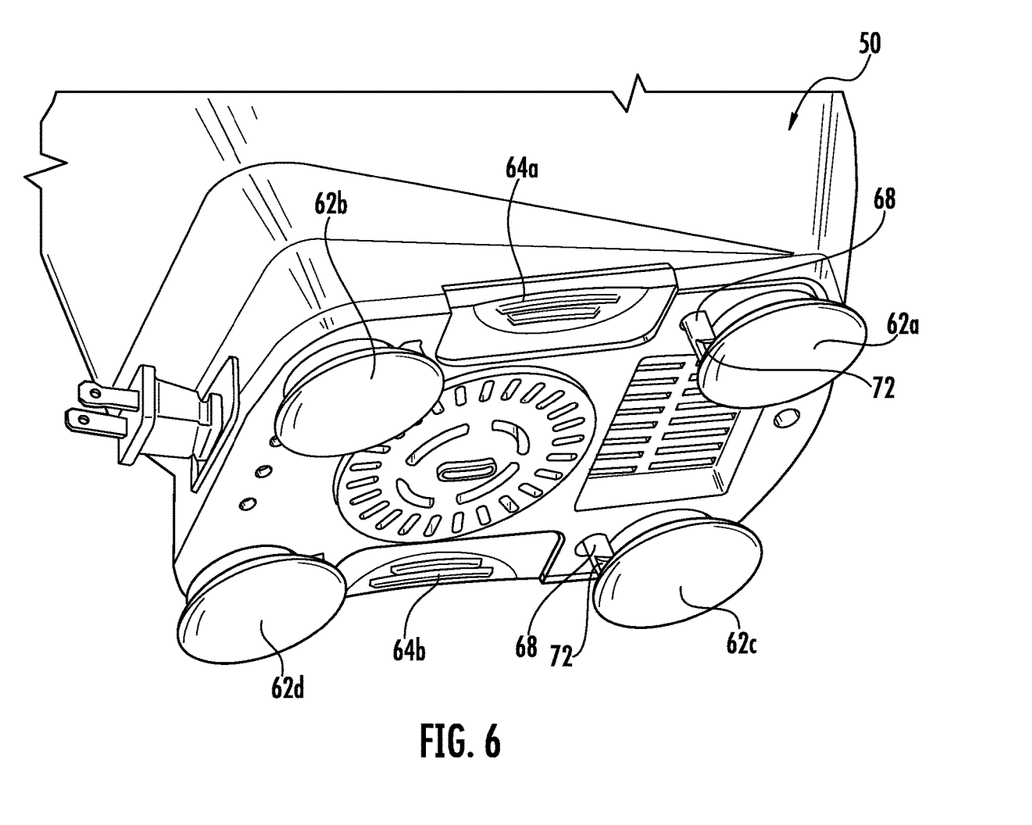
FIG. 6 is a bottom perspective view of another base of a food processing system according to an embodiment of the invention.
Figure 7:
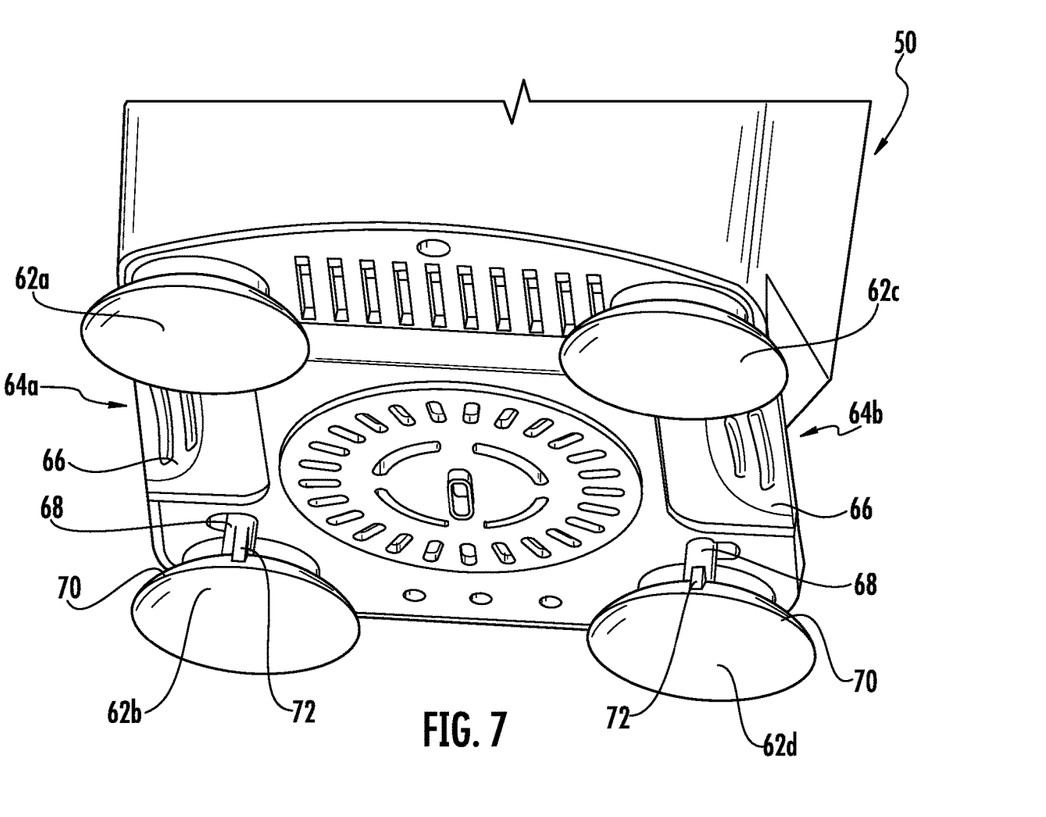
FIG. 7 is another bottom perspective view of a base of a food processing system according to an embodiment of the invention.

In one embodiment, a coupling formed between one of the plurality of suction devices 62 and a respective release mechanism 64, includes a post 68 extending from the release mechanism 64 and connected to an upper surface 70 of the suction device 62 (best shown in FIGS. 6 and 7). The suction device 62 may include a loop or other feature 72 arranged adjacent an outer periphery thereof, to which the post 68 attaches. The coupling illustrated and described herein is intended as an example, and it should be understood that other couplings are within the scope of the invention.

Actuation of a release mechanism 64 is configured to initiate the release of the one or more suction devices 62 coupled thereto from the adjacent working surface. As a release mechanism 64 is moved to the second position, an upward force is transmitted to the suction device 62 via the post 68. By applying the force towards an outer edge of the suction device 62, the suction device 62 is "peeled" away from the working surface, thereby breaking the vacuum seal formed there between. Accordingly, actuation of the one or more release mechanisms 64 allows the base 50 to easily separate from the working surface.

A food processing system 20 having at least one release mechanism 64 as disclosed herein is easily removable from a working surface while retaining an aesthetically pleasing appearance.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Exemplary embodiments of this invention are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A base for a food processing system, comprising: a housing configured to couple with a complementary container, the housing including a bottom surface;
   at least one suction device mounted to the bottom surface, the at least one suction device being configured to adhere the base to an adjacent surface; and
   at least one release mechanism operably coupled to the at least one suction device, the at least one release mechanism being movable between a first position and a second position to apply a vertical force to an outer periphery of the at least one suction device to release the at least one suction device from the adjacent surface, wherein an exterior surface of the at least one release mechanism arranged generally flush with an outer surface of the housing in both the first position and the second position, wherein the at least one release mechanism includes a first release mechanism and a second release mechanism disposed at opposing sides of the base, respectively.

2. The base according to claim 1, wherein the release mechanism is configured to move vertically between the first position and the second position.

3. The base according to claim 1, wherein the release mechanism is configured to move between the first position and the second position in response to application of a force by a user of the food processing system.

4. The base according to claim 1, wherein the release mechanism includes a planar surface arranged approximately parallel to the bottom surface.

5. The base according to claim 1, wherein the first release mechanism and the second release mechanism are independently operable.

6. The base according to claim 1, wherein the at least one suction device includes a front right suction device, a back right suction device, a front left suction device, a back left suction device.

7. The base according to claim 6, wherein the first release mechanism is operably coupled to the front right suction device and the back right suction device, and the second release mechanism is operably coupled to the front left suction device and the back left suction device.

8. The base according to claim 1, wherein the at least one suction device is a suction cup.

9. The base according to claim 1, wherein the container configured to couple to the base further includes a rotatable blade assembly driven about an axis, the rotatable blade assembly being positioned adjacent a bottom of the container.

10. The base according to claim 1, wherein the container configured to couple to the base further includes a rotatable blade assembly driven about an axis, the rotatable blade assembly being positioned adjacent a top of the container.

* * * * *